(12) United States Patent
Jones et al.

(10) Patent No.: US 11,854,569 B2
(45) Date of Patent: *Dec. 26, 2023

(54) DATA COMMUNICATION SYSTEM

(71) Applicant: SONOS EXPERIENCE LIMITED, Hayes (GB)

(72) Inventors: Daniel John Jones, London (GB); James Andrew Nesfield, Edinburgh (GB)

(73) Assignee: Sonos Experience Limited, Hayes (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,020

(22) Filed: Aug. 8, 2022

(65) Prior Publication Data

US 2023/0178092 A1    Jun. 8, 2023

Related U.S. Application Data

(63) Continuation of application No. 16/342,060, filed as application No. PCT/GB2017/053112 on Oct. 13, 2017, now Pat. No. 11,410,670.

(30) Foreign Application Priority Data

Oct. 13, 2016 (GB) ...................... 1617409

(51) Int. Cl.
*G10L 21/0232* (2013.01)
*H04B 11/00* (2006.01)
(Continued)

(52) U.S. Cl.
CPC ...... *G10L 21/0232* (2013.01); *G10L 21/0316* (2013.01); *H04B 11/00* (2013.01);
(Continued)

(58) Field of Classification Search
CPC . G10L 2021/02082; G10L 2021/02163; G10L 21/0232; G10L 21/0316; H04R 3/04; H04R 2420/07; H04B 11/00
See application file for complete search history.

(56) References Cited

U.S. PATENT DOCUMENTS

| 4,045,616 A | 8/1977 | Sloane |
| 4,048,074 A | 9/1977 | Bruenemann |

(Continued)

FOREIGN PATENT DOCUMENTS

| CN | 103259563 A | 8/2013 |
| CN | 105790852 | 7/2016 |

(Continued)

OTHER PUBLICATIONS

Advisory Action dated Mar. 1, 2022, issued in connection with U.S. Appl. No. 16/342,078, filed Apr. 15, 2019, 3 pages.

(Continued)

*Primary Examiner* — Eric Yen
(74) *Attorney, Agent, or Firm* — Nixon & Vanderhye, P.C.

(57) ABSTRACT

The present invention relates to a method for receiving data transmitted acoustically. The method includes receiving an acoustically transmitted signal encoding data; processing the received signal to minimise environmental interference within the received signal; and decoding the processed signal to extract the data. The data encoded within the signal using a sequence of tones. A method for encoding data for acoustic transmission is also disclosed. This method includes encoding data into an audio signal using a sequence of tones. The audio signal in this method is configured to minimise environmental interference. A system and software are also disclosed.

30 Claims, 11 Drawing Sheets

(51) Int. Cl.
*G10L 21/0316* (2013.01)
*H04R 3/04* (2006.01)
*G10L 21/0208* (2013.01)
*G10L 21/0216* (2013.01)

(52) U.S. Cl.
CPC ...... *H04R 3/04* (2013.01); *G10L 2021/02082* (2013.01); *G10L 2021/02163* (2013.01); *H04R 2420/07* (2013.01)

(56) References Cited

U.S. PATENT DOCUMENTS

| | | | |
|---|---|---|---|
| 4,088,030 A * | 5/1978 | Iversen | G01N 29/0618 |
| | | | 73/629 |
| 4,101,885 A | 7/1978 | Blum | |
| 4,323,881 A | 4/1982 | Mori | |
| 4,794,601 A | 12/1988 | Kikuchi | |
| 6,133,849 A | 10/2000 | McConnell | |
| 6,163,803 A | 12/2000 | Watanabe | |
| 6,272,535 B1 * | 8/2001 | Iwamura | G07F 17/16 |
| | | | 709/200 |
| 6,532,477 B1 | 3/2003 | Tang | |
| 6,711,538 B1 | 3/2004 | Omori | |
| 6,766,300 B1 | 7/2004 | Laroche | |
| 6,909,999 B2 | 6/2005 | Thomas | |
| 6,996,532 B2 | 2/2006 | Thomas | |
| 7,058,726 B1 | 6/2006 | Osaku | |
| 7,349,668 B2 | 3/2008 | Ilan | |
| 7,379,901 B1 | 5/2008 | Philyaw | |
| 7,403,743 B2 | 7/2008 | Welch | |
| 7,944,847 B2 | 5/2011 | Trine | |
| 8,494,176 B2 | 7/2013 | Suzuki et al. | |
| 8,594,340 B2 | 11/2013 | Takara et al. | |
| 8,782,530 B2 | 7/2014 | Beringer | |
| 9,118,401 B1 | 8/2015 | Nieto | |
| 9,137,243 B2 | 9/2015 | Suzuki et al. | |
| 9,237,226 B2 | 1/2016 | Frauenthal | |
| 9,270,811 B1 | 2/2016 | Atlas | |
| 9,344,802 B2 | 5/2016 | Suzuki et al. | |
| 10,090,003 B2 | 10/2018 | Wang | |
| 10,186,251 B1 | 1/2019 | Mohammadi | |
| 10,236,006 B1 | 3/2019 | Gurijala et al. | |
| 10,236,031 B1 | 3/2019 | Gurijala | |
| 10,498,654 B2 * | 12/2019 | Shalev | H04L 69/10 |
| 2002/0054608 A1 * | 5/2002 | Wan | H03M 13/2707 |
| | | | 370/522 |
| 2002/0107596 A1 | 8/2002 | Thomas | |
| 2002/0152388 A1 | 10/2002 | Linnartz | |
| 2002/0184010 A1 | 12/2002 | Eriksson | |
| 2003/0065918 A1 | 4/2003 | Willey | |
| 2003/0195745 A1 | 10/2003 | Zinser | |
| 2003/0212549 A1 | 11/2003 | Steenstra | |
| 2004/0002858 A1 | 1/2004 | Attias | |
| 2004/0081078 A1 | 4/2004 | McKnight | |
| 2004/0133789 A1 | 7/2004 | Gantman | |
| 2004/0148166 A1 | 7/2004 | Zheng | |
| 2004/0264713 A1 | 12/2004 | Grzesek | |
| 2005/0049732 A1 | 3/2005 | Kanevsky | |
| 2005/0086602 A1 | 4/2005 | Philyaw | |
| 2005/0219068 A1 | 10/2005 | Jones | |
| 2006/0167841 A1 | 7/2006 | Allan | |
| 2006/0253209 A1 | 11/2006 | Hersbach | |
| 2006/0287004 A1 | 12/2006 | Fuqua | |
| 2007/0063027 A1 | 3/2007 | Belfer | |
| 2007/0121918 A1 | 5/2007 | Tischer | |
| 2007/0144235 A1 | 6/2007 | Werner | |
| 2007/0174052 A1 | 7/2007 | Manjunath | |
| 2007/0192672 A1 | 8/2007 | Bodin | |
| 2007/0192675 A1 | 8/2007 | Bodin | |
| 2007/0232257 A1 | 10/2007 | Otani | |
| 2007/0268162 A1 * | 11/2007 | Viss | G01R 31/31937 |
| | | | 341/51 |
| 2008/0002882 A1 | 1/2008 | Voloshynovskyy | |
| 2008/0011825 A1 | 1/2008 | Giordano | |
| 2008/0027722 A1 | 1/2008 | Haulick | |
| 2008/0031315 A1 | 2/2008 | Ramirez | |
| 2008/0059157 A1 | 3/2008 | Fukuda et al. | |
| 2008/0112885 A1 | 5/2008 | Okunev | |
| 2008/0144624 A1 | 6/2008 | Marcondes et al. | |
| 2008/0232603 A1 | 9/2008 | Soulodre | |
| 2008/0242357 A1 | 10/2008 | White | |
| 2008/0262928 A1 | 10/2008 | Michaelis | |
| 2009/0034712 A1 | 2/2009 | Grasley | |
| 2009/0119110 A1 | 5/2009 | Oh | |
| 2009/0123002 A1 | 5/2009 | Karthik et al. | |
| 2009/0141890 A1 | 6/2009 | Steenstra | |
| 2009/0175257 A1 * | 7/2009 | Belmonte | H04L 27/2607 |
| | | | 370/345 |
| 2009/0254485 A1 | 10/2009 | Baentsch | |
| 2010/0030838 A1 | 2/2010 | Atsmon | |
| 2010/0064132 A1 | 3/2010 | Ravikiran | |
| 2010/0088390 A1 | 4/2010 | Bai | |
| 2010/0134278 A1 | 6/2010 | Srinivasan | |
| 2010/0146115 A1 | 6/2010 | Bezos | |
| 2010/0223138 A1 | 9/2010 | Dragt | |
| 2010/0267340 A1 | 10/2010 | Lee | |
| 2010/0290504 A1 * | 11/2010 | Torimoto | G01S 5/012 |
| | | | 342/357.4 |
| 2010/0290641 A1 | 11/2010 | Steele | |
| 2011/0173208 A1 | 7/2011 | Vogel | |
| 2011/0216783 A1 * | 9/2011 | Takeuchi | H04L 1/0047 |
| | | | 370/474 |
| 2011/0276333 A1 | 11/2011 | Wang | |
| 2011/0277023 A1 | 11/2011 | Meylemans | |
| 2011/0307787 A1 * | 12/2011 | Smith | G06F 16/9566 |
| | | | 715/727 |
| 2012/0045994 A1 | 2/2012 | Koh et al. | |
| 2012/0075083 A1 * | 3/2012 | Isaacs | H04M 3/493 |
| | | | 340/13.2 |
| 2012/0084131 A1 | 4/2012 | Bergel | |
| 2012/0214416 A1 | 8/2012 | Kent | |
| 2012/0214544 A1 | 8/2012 | Shivappa et al. | |
| 2013/0010979 A1 | 1/2013 | Takara | |
| 2013/0030800 A1 | 1/2013 | Tracey | |
| 2013/0034243 A1 | 2/2013 | Yermeche | |
| 2013/0077798 A1 | 3/2013 | Otani et al. | |
| 2013/0113558 A1 | 5/2013 | Pfaffinger et al. | |
| 2013/0216058 A1 | 8/2013 | Furuta | |
| 2013/0223279 A1 | 8/2013 | Tinnakornsrisuphap | |
| 2013/0275126 A1 | 10/2013 | Lee | |
| 2014/0028818 A1 | 1/2014 | Brockway | |
| 2014/0046464 A1 | 2/2014 | Reimann | |
| 2014/0053281 A1 | 2/2014 | Benoit | |
| 2014/0074469 A1 | 3/2014 | Zhidkov | |
| 2014/0108020 A1 | 4/2014 | Sharma et al. | |
| 2014/0142958 A1 | 5/2014 | Sharma | |
| 2014/0164629 A1 | 6/2014 | Barth et al. | |
| 2014/0172141 A1 | 6/2014 | Mangold | |
| 2014/0172429 A1 | 6/2014 | Butcher | |
| 2014/0258110 A1 | 9/2014 | Davis | |
| 2015/0004935 A1 | 1/2015 | Fu | |
| 2015/0088495 A1 * | 3/2015 | Jeong | H04B 11/00 |
| | | | 704/205 |
| 2015/0141005 A1 | 5/2015 | Suryavanshi | |
| 2015/0215299 A1 | 7/2015 | Burch | |
| 2015/0248879 A1 | 9/2015 | Miskimen | |
| 2015/0271676 A1 | 9/2015 | Shin et al. | |
| 2015/0349841 A1 | 12/2015 | Mani | |
| 2015/0371529 A1 | 12/2015 | Dolecki | |
| 2015/0382197 A1 | 12/2015 | Kashef | |
| 2016/0007116 A1 * | 1/2016 | Holman | H04R 29/002 |
| | | | 381/56 |
| 2016/0098989 A1 | 4/2016 | Layton | |
| 2017/0208170 A1 | 7/2017 | Mani et al. | |
| 2017/0279542 A1 | 9/2017 | Knauer | |
| 2018/0106897 A1 | 4/2018 | Shouldice | |
| 2018/0115844 A1 | 4/2018 | Lu et al. | |
| 2018/0213322 A1 | 7/2018 | Napoli et al. | |
| 2018/0359560 A1 | 12/2018 | Defraene | |
| 2019/0045301 A1 | 2/2019 | Family et al. | |
| 2019/0096398 A1 | 3/2019 | Sereshki | |
| 2019/0357196 A1 * | 11/2019 | Majmundar | H04L 49/3072 |
| 2020/0091963 A1 | 3/2020 | Christoph et al. | |

(56) References Cited

U.S. PATENT DOCUMENTS

| | | | |
|---|---|---|---|
| 2020/0105128 | A1 | 4/2020 | Frank |
| 2020/0169327 | A1 | 5/2020 | Lin |
| 2021/0098008 | A1 | 4/2021 | Nesfield |

FOREIGN PATENT DOCUMENTS

| | | |
|---|---|---|
| CN | 106921650 | 7/2017 |
| EP | 1760693 | 3/2007 |
| EP | 2334111 | 6/2011 |
| EP | 2916554 | 9/2015 |
| EP | 3275117 | 1/2018 |
| EP | 3408936 A2 | 12/2018 |
| EP | 3526912 | 8/2019 |
| GB | 2369995 | 6/2002 |
| GB | 2484140 | 4/2012 |
| JP | H1078928 | 3/1998 |
| JP | 2001320337 | 11/2001 |
| JP | 2004512765 | 4/2004 |
| JP | 2004139525 | 5/2004 |
| JP | 2007121626 | 5/2007 |
| JP | 2007195105 | 8/2007 |
| JP | 2008219909 | 9/2008 |
| WO | 0016497 A1 | 3/2000 |
| WO | 0115021 | 3/2001 |
| WO | 0150665 | 7/2001 |
| WO | 0161987 | 8/2001 |
| WO | 0163397 | 8/2001 |
| WO | 0211123 | 2/2002 |
| WO | 0235747 | 5/2002 |
| WO | 2004002103 | 12/2003 |
| WO | 2005/006566 | 1/2005 |
| WO | 2008131181 | 10/2008 |
| WO | 2016094687 | 6/2016 |

OTHER PUBLICATIONS

Advisory Action dated Aug. 19, 2022, issued in connection with U.S. Appl. No. 16/496,685, filed Sep. 23, 2019, 3 pages.
European Patent Office, European EPC Article 94.3 dated Oct. 25, 2022, issued in connection with European Application No. 20153173.8, 5 pages.
European Patent Office, European EPC Article 94.3 dated Jul. 6, 2022, issued in connection with European Application No. 20153173.8, 4 pages.
Final Office Action dated May 10, 2022, issued in connection with U.S. Appl. No. 16/496,685, filed Sep. 23, 2019, 15 pages.
Final Office Action dated Mar. 18, 2022, issued in connection with U.S. Appl. No. 16/623,160, filed Dec. 16, 2019, 14 pages.
International Bureau, International Preliminary Report on Patentability and Written Opinion, dated Dec. 17, 2019, issued in connection with International Application No. PCT/GB2018/051645, filed on Jun. 14, 2018, 7 pages.
International Bureau, International Preliminary Report on Patentability and Written Opinion, dated Mar. 19, 2019, issued in connection with International Application No. PCT/GB2017/052787, filed on Sep. 19, 2017, 7 pages.
International Bureau, International Preliminary Report on Patentability and Written Opinion, dated Jun. 23, 2020, issued in connection with International Application No. PCT/GB2018/053733, filed on Dec. 20, 2018, 7 pages.
International Bureau, International Preliminary Report on Patentability and Written Opinion, dated Sep. 24, 2019, issued in connection with International Application No. PCT/GB2018/050779, filed on Mar. 23, 2018, 6 pages.
International Bureau, International Search Report and Written Opinion dated Apr. 11, 2019, issued in connection with International Application No. PCT/GB2018/053733, filed on Dec. 20, 2018, 10 pages.
International Bureau, International Search Report and Written Opinion dated Sep. 21, 2022, issued in connection with International Application No. PCT/US2022/072465, filed on May 20, 2022, 32 pages.
International Bureau, International Search Report and Written Opinion dated Oct. 4, 2018, issued in connection with International Application No. PCT/GB2018/051645, filed on Jun. 14, 2018, 14 pages.
International Searching Authority, International Search Report and Written Opinion dated Jan. 5, 2022, issued in connection with International Application No. PCT/US2021/048380, filed on Aug. 31, 2021, 15 pages.
Non-Final Office Action dated Oct. 4, 2022, issued in connection with U.S. Appl. No. 16/496,685, filed Sep. 23, 2019, 15 pages.
Non-Final Office Action dated Feb. 5, 2014, issued in connection with U.S. Appl. No. 12/926,470, filed Nov. 19, 2010, 22 pages.
Non-Final Office Action dated Jul. 1, 2022, issued in connection with U.S. Appl. No. 16/623,160, filed Dec. 16, 2019, 10 pages.
Non-Final Office Action dated Jul. 11, 2022, issued in connection with U.S. Appl. No. 17/660,185, filed Apr. 21, 2022, 20 pages.
Non-Final Office Action dated Aug. 12, 2021, issued in connection with U.S. Appl. No. 16/342,060, filed Apr. 15, 2019, 88 pages.
Non-Final Office Action dated Jul. 21, 2022, issued in connection with U.S. Appl. No. 16/956,905, filed Jun. 22, 2020, 15 pages.
Non-Final Office Action dated Jan. 29, 2021, issued in connection with U.S. Appl. No. 16/342,060, filed Apr. 15, 2019, 59 pages.
Notice of Allowance dated Aug. 11, 2022, issued in connection with U.S. Appl. No. 16/342,078, filed Apr. 15, 2019, 15 pages.
Notice of Allowance dated Mar. 29, 2022, issued in connection with U.S. Appl. No. 16/342,060, filed Apr. 15, 2019, 24 pages.
Notice of Allowance dated Apr. 5, 2022, issued in connection with U.S. Appl. No. 16/956,905, filed Jun. 22, 2020, 9 pages.
United Kingdom Patent Office, United Kingdom Office Action dated May 10, 2022, issued in connection with United Kingdom Application No. GB2202914.4, 5 pages.
United Kingdom Patent Office, United Kingdom Office Action dated Mar. 24, 2022, issued in connection with United Kingdom Application No. GB2202914.4, 3 pages.
International Search Report for PCT/GB2017/053112, dated Mar. 13, 2018, 7 pages.
Written Opinion of the ISA for PCT/GB2017/053112, dated Mar. 13, 2018, 11 pages.
Gomez et al., "Distant talking robust speech recognition using late reflection components of room impulse response", Acoustics, Speech and Signal Processing, 2008. ICASSP 2008. IEEE International Conference, Mar. 31, 2008, pp. 4581-4584.
Gomez et al., "Robust Speech Recognition in Reverberant Environment by Optimizing Multi-band Spectral Subtraction", 2013 IEEE International Conference on Acoustics, Speech and Signal Processing (ICASSP), Jan. 1, 2008.
Tarr, E. W. Processing perceptually important temporal and spectral characteristics of speech, 2013, Available from ProQuest Dissertations and Theses Professional. Retrieved from https://dialog.proquest.com/professional/docview/1647737151?accountid=131444 (Year: 2013).
C. Beaugeant and H. Taddei, Quality and computation load reduction achieved by applying smart transcoding between CELP speech codecs, 2007, 2007 15th European Signal Processing Conference, pp. 1372-1376. (Year: 2007).
Bourguet et al. "A Robust Audio Extraction Algorithm for Music Identification," AES Convention 129; Nov. 4, 2010, 7 pages.
European Patent Office, Decision to Refuse dated Nov. 13, 2019, issued in connection with European Patent Application No. 11773522.5, 52 pages.
Glover, J., Lazzarini, V. & Timoney, J. Real-time detection of musical onsets with linear prediction and sinusoidal modeling., 2011 EURASIP J. Adv. Signal Process. 2011, 68, https://doi.org/10.1 186/1687-6180-2011-68 (Year: 2011).
Monaghan, J. J. M., & Seeber, B. U. A method to enhance the use of interaural time differences for cochlear implants in v reverberant environments., 2016, Journal of the Acoustical Society of America, 140(2), 1116-29. doi :http://dx.doi org/i0.1121/1.4960572 (Year: 2016).
Gomez et al., Distant talking robust speech recognition using late reflection components of room impulse response, Acoustics, Speech and Signal Processing, 2008. ICASSP 2008. IEEE International Conference, Mar. 31, 2008, pp. 4581-4584 (Year: 2008).

(56) References Cited

OTHER PUBLICATIONS

Gomez etal., Robust Speech Recognition in Reverberant Environment by Optimizing Multi-band Spectral Subtraction, 2013 IEEE International Conference on Acoustics, Speech and Signal Processing (ICASSP), Jan. 1, 2008 (Year: 2008).
European Patent Office, European Extended Search Report dated Aug. 31, 2020, issued in connection with European Application No. 20153173.8, 8 pages.
European Patent Office, Summons to Attend Oral Proceedings dated Mar. 15, 2019, issued in connection with European Application No. 11773522.5-1217, 10 pages.
Final Office Action dated Oct. 16, 2014, issued in connection with U.S. Appl. No. 12/926,470, filed Nov. 19, 2010, 22 pages.
Final Office Action dated Aug. 17, 2017, issued in connection with U.S. Appl. No. 12/926,470, filed Nov. 19, 2010, 22 pages.
Final Office Action dated Nov. 30, 2015, issued in connection with U.S. Appl. No. 12/926,470, filed Nov. 19, 2010, 25 pages.
Final Office Action dated Apr. 20, 2020, issued in connection with U.S. Appl. No. 16/012,167, filed Jun. 19, 2018, 21 pages.
Gerasimov et al. Things that Talk: Using sound for device-to-device and device-to-human communication:, Feb. 2000 IBM Systems Journal 39(3.4):530-546, 18 pages. [Retrieved Online] URlhttps://www.researchgate.net/publication/224101904_Things_that_talk_using_sound_for_device-to-device_and_device-to-human_communication.
Goodrich et al., using Audio inn Secure Device Pairing, International Journal of Security and Networks, vol. 4, No. 1.2, Jan. 1, 2009, p. 57, Inderscience Enterprises Ltd., 12 pages.
International Bureau, International Preliminary Report on Patentability and Written Opinion, dated Apr. 16, 2019, issued in connection with International Application No. PCT/GB2017/053112, filed on Oct. 13, 2017, 12 pages.
International Bureau, International Preliminary Report on Patentability and Written Opinion, dated Apr. 16, 2019, issued in connection with International Application No. PCT/GB2017/053113, filed Oct. 13, 2017, 8 pages.
International Searching Authority, International Search Report and Written Opinion dated Nov. 29, 2017, in connection with International Application No. PCT/GB2017/052787, 10 pages.
International Searching Authority, International Search Report and Written Opinion dated Nov. 30, 2011, in connection with International Application No. PCT/GB2011/051862, 6 pages.
International Searching Authority, International Search Report and Written Opinion dated Jan. 18, 2018, in connection with International Application No. PCT/GB2017/053113, filed Oct. 17, 2017, 11 pages.
International Searching Authority, International Search Report and Written Opinion dated Jun. 19, 2018, issued in connection with International Application No. PCT/GB2018/050779, filed on Mar. 23, 2018, 8 pages.
Japanese Patent Office, Office Action dated Jun. 23, 2015, issued in connection with JP Application No. 2013-530801, 8 pages.
Japanese Patent Office, Office Action dated Apr. 4, 2017, issued in connection with JP Application No. 2013-530801, 8 pages.
Japanese Patent Office, Office Action dated Jul. 5, 2016, issued in connection with JP Application No. 2013-530801, 8 pages.
Lopes et al. "Acoustic Modems for Ubiquitous Computing", IEEE Pervasive Computing, Mobile and Ubiquitous Systems. vol. 2, No. 3 Jul.-Sep. 2003, pp. 62-71. [Retrieved Online] URL https://lwwwresearchgate.net/publication/3436996_Acoustic_moderns_for_ubiquitous_computing.
Madhavapeddy, AniL Audio Networking for Ubiquitous Computing, Oct. 24, 2003, 11 pages.
Madhavapeddy et al., Audio Networking: The Forgotten Wireless Technology, IEEE CS and IEEE ComSoc, Pervasive Computing, Jul.-Sep. 2005, pp. 55-60.
Madhavapeddy et al., Context-Aware Computing with Sound, University of Cambridge 2003, pp. 315-332.
Non-Final Office Action dated Mar. 25, 2015, issued in connection with U.S. Appl. No. 12/926,470, filed Nov. 19, 2010, 24 pages.
Non-Final Office Action dated Mar. 28, 2016, issued in connection with U.S. Appl. No. 12/926,470, filed Nov. 19, 2010, 26 pages.
Non-Final Office Action dated Jan. 6, 2017, issued in connection with U.S. Appl. No. 12/926,470, filed Nov. 19, 2010, 22 pages.
Non-Final Office Action dated Aug. 9, 2019, issued in connection with U.S. Appl. No. 16/012,167, filed Jun. 19, 2018, 15 pages.
Non-Final Office Action dated Sep. 24, 2020, issued in connection with U.S. Appl. No. 16/012,167, filed Jun. 19, 2018, 20 pages.
Non-Final Office Action dated Feb. 5, 20221, issued in connection with U.S. Appl. No. 16/342,078, filed Apr. 15, 2019, 13 pages.
Non-Final Office Action dated Sep. 7, 2021, issued in connection with U.S. Appl. No. 16/623,160, filed Dec. 16, 2019, 11 pages.
Notice of Allowance dated Mar. 15, 2018, issued in connection with U.S. Appl. No. 12/926,470, filed Nov. 19, 2010, 10 pages.
Notice of Allowance dated Mar. 19, 2021, issued in connection with U.S. Appl. No. 16/012,167, filed Jun. 19, 2018, 9 pages.
Soriente et al., "HAPADEP: Human-Assisted Pure Audio Device Pairing" Computer Science Department, University of California Irvine, 12 pages. [Retrieved Online] URLhttps://www.researchgate.net/publication/220905534_HAPADEP_Human-assisted_pure_audio_device_pairing.
United Kingdom Patent Office, United Kingdom Examination Report dated Jun. 11, 2021, issued in connection with United Kingdom Application No. GB1716909.5, 5 pages.
United Kingdom Patent Office, United Kingdom Examination Report dated Feb. 2, 2021, issued in connection with United Kingdom Application No. GB1715134.1, 5 pages.
United Kingdom Patent Office, United Kingdom Examination Report dated Jan. 22, 2021, issued in connection with United Kingdom Application No. GB1906696.8, 2 pages.
Wang, Avery Li-Chun. An Industrial-Strength Audio Search Algorithm. Oct. 27, 2003, 7 pages [online]. [retrieved on May 12, 2020] retrieved from the Internet URL: https://www.researchgate.net/publication/220723446_An_Industrial_Strength_Audio_Search_Algorithm.
European Patent Office, European EPC Article 94.3 dated Oct. 8, 2021, issued in connection with European Application No. 17790809.2, 9 pages.
European Patent Office, European EPC Article 94.3 dated Dec. 10, 2021, issued in connection with European Application No. 18845403.7, 41 pages.
European Patent Office, European EPC Article 94.3 dated Oct. 12, 2021, issued in connection with European Application No. 17795004.5, 8 pages.
European Patent Office, European EPC Article 94.3 dated Oct. 28, 2021, issued in connection with European Application No. 18752180.2, 7 pages.
Non-Final Office Action dated Oct. 15, 2021, issued in connection with U.S. Appl. No. 16/496,685, filed Sep. 23, 2019, 12 pages.
Non-Final Office Action dated Dec. 27, 2021, issued in connection with U.S. Appl. No. 16/956,905, filed Jun. 22, 2020, 12 pages.
Notice of Allowance dated Feb. 18, 2022, issued in connection with U.S. Appl. No. 16/564,766, filed Sep. 9, 2019, 8 pages.
United Kingdom Patent Office, United Kingdom Examination Report dated Oct. 8, 2021, issued in connection with United Kingdom Application No. GB2113511.6, 7 pages.
United Kingdom Patent Office, United Kingdom Examination Report dated Oct. 29, 2021, issued in connection with United Kingdom Application No. GB1709583.7, 3 pages.
United Kingdom Patent Office, United Kingdom Examination Report dated Jan. 28, 2022, issued in connection with United Kingdom Application No. GB2113511.6, 3 pages.
United Kingdom Patent Office, United Kingdom Examination Report dated Feb. 9, 2022, issued in connection with United Kingdom Application No. GB2117607.8, 3 pages.
United Kingdom Patent Office, United Kingdom Examination Report dated Sep. 22, 2021, issued in connection with United Kingdom Application No. GB2109212.7, 5 pages.

* cited by examiner

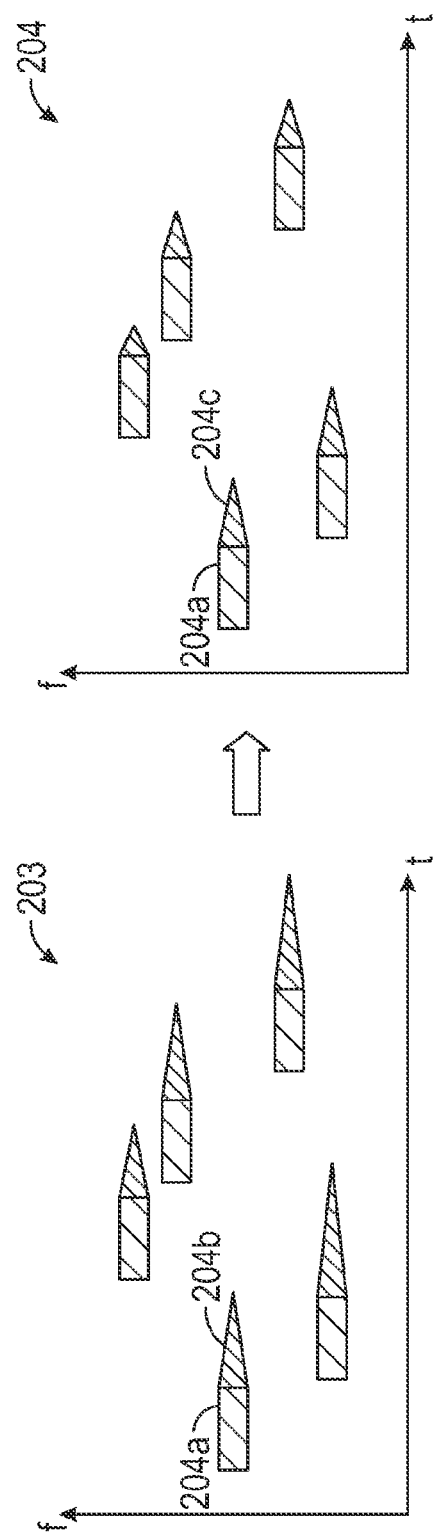

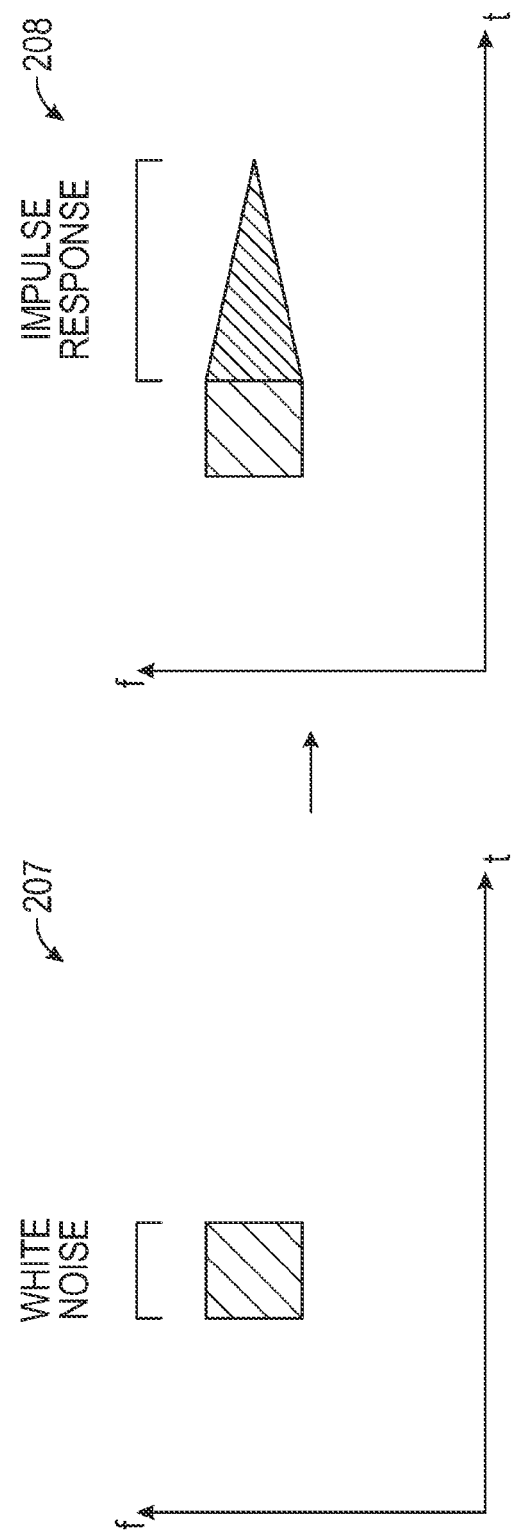

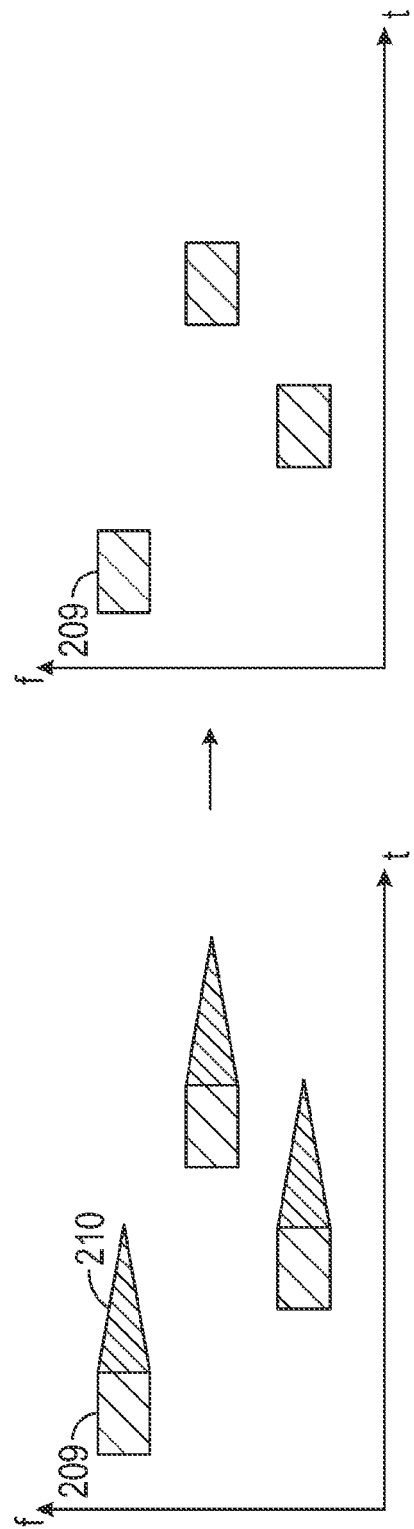

300

301

Encode data into an audio signal using a sequence of tones, the audio signal configured to minimise environmental interference

FIG. 3

DATA COMMUNICATION SYSTEM

This application is a continuation of U.S. application Ser. No. 16/342,060 filed Apr. 15, 2019, which is a U.S. national phase of International Application No. PCT/GB2017/053112 filed 13 Oct. 2017, which designated the U.S. and claims priority to GB Patent Application No. 1617409.6 filed 13 Oct. 2016, the entire contents of each of which are hereby incorporated by reference.

FIELD OF INVENTION

The present invention is in the field of data communication. More particularly, but not exclusively, the present invention relates to a method and system for acoustic communication of data.

BACKGROUND

There are a number of solutions to communicating data wirelessly over a short range to and from devices. The most typical of these is WiFi. Other examples include Bluetooth and Zigbee.

An alternative solution for a short range data communication is described in U.S. patent Publication Ser. No. 12/926,470, DATA COMMUNICATION SYSTEM. This system, invented by Patrick Bergel and Anthony Steed, involves the transmission of data using an audio signal transmitted from a speaker and received by a microphone. This system involves the encoding of data, such as shortcode, into a sequence of tones within the audio signal.

This acoustic communication of data provides for novel and interesting applications. However, acoustic communication of data does involve unique problems. Specifically, because the signals are transmitted acoustically, the receiver receives a signal that may include a lot of interference created by the environment in which the signal is transmitted which may, for example, be reverberation (including early/late reflections). At the point of receiving the audio, distortions caused by interference have the effect of reducing reliable data rates due to the decoder's increased uncertainty about a signal's original specification. For example, early reflections which are coherent but delayed versions of the direct signal, usually created from an acoustic reflection from a hard surface, may make it more difficult for a decoder to confidently determine the precise start or end point of a signal feature/note. This decreases overall reliability. It is therefore preferable to reduce these effects at the receiver. Otherwise the data encoded within the signal can be difficult to accurately detect. This can result in non-communication of data in certain environments or under certain conditions within environments.

There is a desire to improve the acoustic communication of data.

It is an object of the present invention to provide a method and system for acoustic communication of data which overcomes the disadvantages of the prior art, or at least provides a useful alternative.

SUMMARY OF INVENTION

According to a first aspect of the invention there is provided a method or receiving data transmitted acoustically, including:

a) receiving an acoustically transmitted signal encoding data;

b) processing the received signal to minimise environmental interference within the received signal; and c) decoding the processed signal to extract the data.

wherein the data is encoded within the transmitted signal using a sequence of tones.

The signal may be human-audible.

The environmental interference may be caused by/during transmission of the signal.

The environmental interference may be reverberation.

The received signal may be processed by frame. Each frame of the received signal may be processed to generate a Fast-Fourier Transform (FFT).

The FFT for at least some of the frames may be processed to modify a magnitude in each bin of the FFT in accordance with a magnitude value of the corresponding bin in a preceding frame.

An impulse response of an acoustic environment may be calculated. The impulse response may be calculated via measurements of the acoustic space. The impulse response may be processed to generate a transfer function. The received signal may be processed using the transfer function.

The signal may be received via a microphone.

According to a further aspect of the invention there is provided a method for encoding data for acoustic transmission, including encoding data into an audio signal using a sequence of tones;

wherein the audio signal is configured to minimise environmental interference.

Characteristics of at least some of the tones and/or sequence of tones may be modified to minimise the environmental interference. The characteristics may be modified based upon predictions of interference caused to the sequence of tones when received by a receiver. The predictions may relate to interference generated by acoustic transmission of the sequence of tones. The interference generated may be non-direct acoustic energy. The interference may be reverberation.

The audio signal may be configured by configuring the sequence of tones such that at least some of the tone frequencies are arranged from high to low. The at least some of the tone frequencies may correspond to a plurality of tones at the beginning of the signal.

The audio signal may be configured by configuring the sequence of tones to insert space between at least some of the tones within the signal.

The audio signal may be configured by sharpening the amplitude envelope of each tone signal within the audio signal.

The audio signal may be configured by configuring the sequence of tones to avoid repeating same or similar frequency tones one after the other.

The environmental interference may be reverberation.

The method of the above aspect may further include the step of acoustically transmitting the audio signal for receipt by a microphone.

Other aspects of the invention are described within the claims.

BRIEF DESCRIPTION OF THE DRAWINGS

Embodiments of the invention will now be described, by way of example only, with reference to the accompanying drawings in which:

FIG. 2a: shows a diagram illustrating reduction of reverberation of tones within a received audio signal in accordance with an embodiment of the invention;

FIG. 2c: shows a diagram illustrating determination of an impulse response for use in a method in accordance with an embodiment of the invention;

FIG. 2d: shows a diagram illustrating use of a determined impulse response to deconvolute an input signal in accordance with an embodiment of the invention;

FIG. 3: shows a flow diagram illustrating a method in accordance with an embodiment of the invention;

DETAILED DESCRIPTION OF PREFERRED EMBODIMENTS

The present invention provides a method and system for the acoustic communication of data.

The inventors have discovered that, when the data is encoded in sequence of tones, that the received signal can be processed to minimise environmental interference before decoding, such processing enables more accurate decoding of the signal into the data. Furthermore, the inventors have discovered that the signal can be encoded before acoustic transmission to also minimise environmental interference. Thereby, improving accuracy of data decoding by the recipient.

Figure 1:
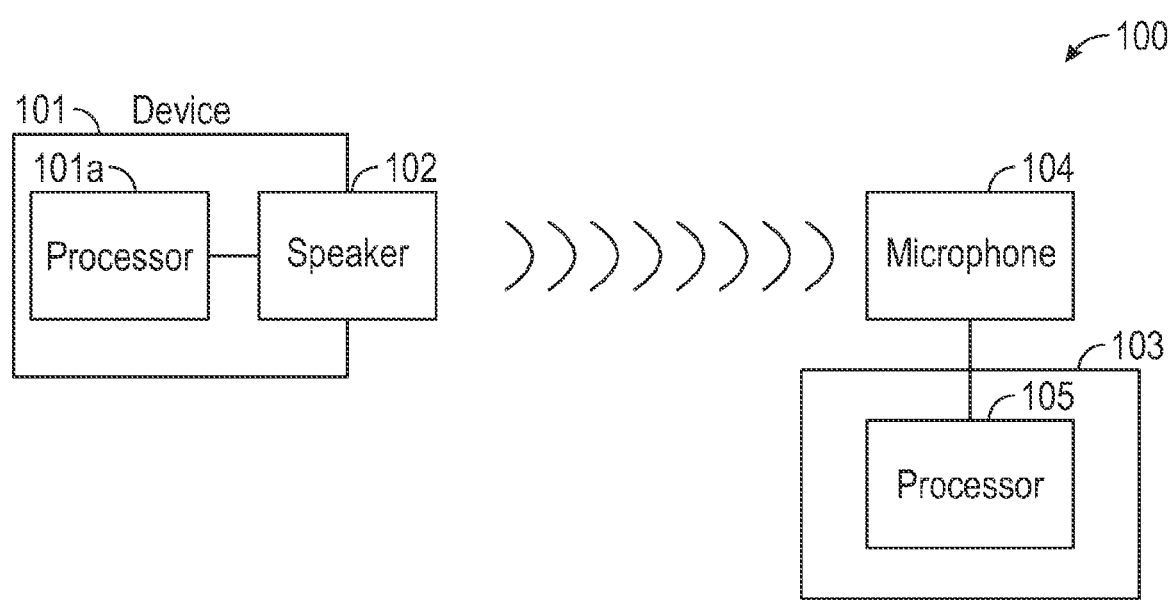
FIG. 1: shows a block diagram illustrating a system in accordance with an embodiment of the invention.

In FIG. 1, a system 100 in accordance with an embodiment of the invention is shown.

A first device is shown 101. This device 101 may include a processor 101a and a speaker 102. The processor 101a may be configured to encode data into a sequence of tones within an audio signal. The signal may be encoded by the processor 101a to minimise environmental interference. The processor 101a may be configured to perform the method described in relation to FIG. 3.

The device 101 may be configured to acoustically transmit the signal, for example, via the speaker 102.

The environmental interference may be that which would be generated by acoustic transmission of signal by the speaker 102. The environmental interference may be distortion introduced by the speaker 102 or non-direct acoustic energies caused by this transmission such as reverberation. In this document, the term reverberation should be interpreted to cover first order reflections and echoes as well as true reverberation (e.g. later order reflections). The signal may be encoded by modifying characteristics of the tones and/or sequence of tones based upon, for example, predicting the environmental interference that would be caused to a signal received by a receiver.

The processor 101a and device 101 may encode and output the audio signal via a standard digital to analogue converter or via pulse-width modulation. Pulse-width modulation may be more efficient on very low power devices.

The audio signal may be encoded dynamically for immediate acoustic transmission or precomputed and stored in memory for later playback.

In embodiments, the processor 101a and speaker 102 may not be co-located at the same device. For example, the processor 101a may encode the data into the audio signal and transmit the audio signal to a device for acoustic transmission at the speaker 102. The audio signal may be stored at a memory before acoustic transmission.

A second device 103 is shown. This second device 103 may include or be connected to a microphone 104. The microphone 104 may be configured to receive signals acoustically transmitted, for example, by the first device 101, and to forward those signals to one or more processors 105 within the second device 103. In embodiments, the processor(s) 105 are not located within the second device 103. For example, the processor(s) 105 may be remotely located.

The microphone 104 and the processor(s) 105 may be connected via a communications bus or via a wired or wireless network connection.

The processor(s) 105 may be configured to process the signal to minimise environmental interference and to decode the signal to extract data. The data may have been encoded within the signal as a sequence of tones. The environmental interference may have been generated by acoustic transmission of the signal by speaker (such speaker 102) including, for example, distortion caused by the speaker or playback media (e.g. tape/vinyl/compression codecs) or non-direct acoustic energies such as reverberation.

Figure 2:
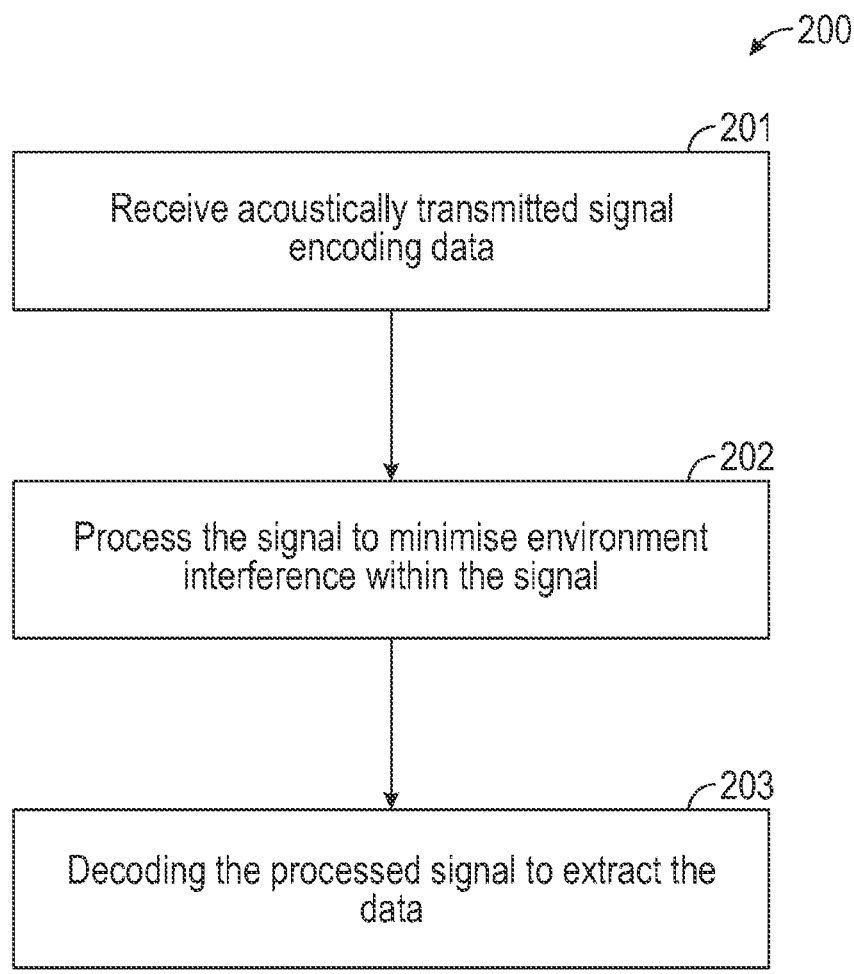
FIG. 2: shows a flow diagram illustrating a method in accordance with an embodiment of the invention.

The processor(s) 105 may be configured to perform the method described in relation to FIG. 2.

In some embodiments, the microphone 104 may be configured with a narrow polar response to further mitigate environmental interference such as reverberation and any other non-direct acoustic energies.

In some embodiments, the second device may include multiple microphones 104 coordinated in a phase-array or beam-forming implementation to further mitigate environmental interference.

It will be appreciated by those skilled in the art that the above embodiments of the invention may be deployed on different devices and in differing architectures.

Referring to FIG. 2, a method 200 for receiving acoustically transmitted data in accordance with an embodiment of the invention will be described.

Figure 4:
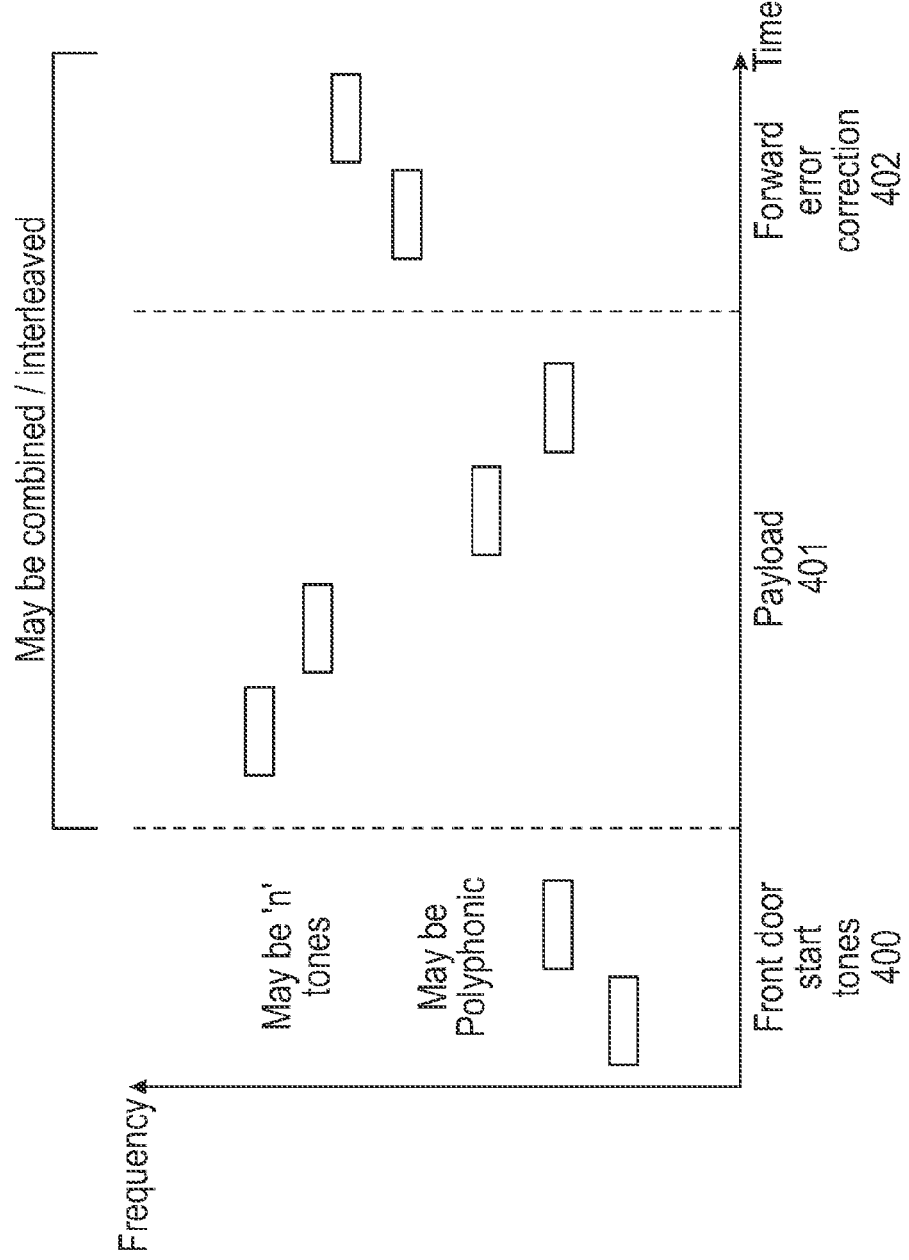
FIG. 4: shows a diagram illustrating an encoding format for an audio signal for use with methods in accordance with embodiments of the invention.

In step 201, an acoustically transmitted signal is received (for example, via microphone 104). The signal encodes data. The data is encoded as a sequence of tones. The encoding format of the signal may include a header, error correction and a payload. An example of an encoding format is shown in FIG. 4. The encoding format may define that all or at least part of each of the header, error correction and payload are encoded as a sequence of tones. Reed-Solomon may be used as error correction. It will be appreciated that other error correction methods may be used such as Hamming or Turbo Codes. At least a part of the encoding of the data and/or encoding format of the signal may be performed as described in U.S. patent Publication Ser. No. 12/926,470.

The signal may be human-audible, either fully or at least in part. For example, data may be encoded within the signal across a frequency spectrum which includes human-audible frequencies.

The inventors note that human-audible frequencies are particularly vulnerable to environmental interference caused by reverberation of the acoustically transmitted signal within the environment due to the sound absorption coefficient of materials being generally proportional to frequency (causing reverberation at human-audible frequencies but little reverberation at higher frequencies).

In step 202, the signal is processed to minimise environmental interference. The environmental interference may be non-direct acoustic energy having originally emanated from the signal transmitting device such as reverberation. The signal may be processed to minimise interference by artificially compounding the decay of non-direct energy.

In one embodiment, the signal may be processed using a fast fourier transform (FFT) to produce bins of magnitudes across the spectrum. The FFT can be calculated on a per-frame basis. With the reverb cancellation values, the value passed to a decoding engine at a given frame t ($Z_t$) is a combination of the current FFT magnitude ($X_t$) and a function of previous output values ($Y_{t-1}$):

$$Y_t = \alpha_b Y_{t-1} + (1-\alpha_b)X_t$$

$$Z_t = X_t - \beta Y_{t-1}$$

Where the reverb cancellation is characterised by:
- $\beta_b \in [0, 1]$: reverb rolloff exponent for a given FFT bin b, which should be selected proportionally to the length of the reverb tail of the acoustic environment; Typically close to 1.
- $\beta \in [0, 1]$: reverb cancellation magnitude, which determine the degree to which reverb is subtracted from the magnitude of the current spectral frame.

FIG. 2a shows an example where reverberation reduction is applied to a sequence of tones (e.g. to convert audio signal 203 to 204 such that the tone 204a in the signal is more distinguishable by reducing its reverberation 204b to 204c). Lower frequencies tend to exhibit longer reverberation times (RT60), so reverb reduction is less effective in these lower bands.

Figure 2B:
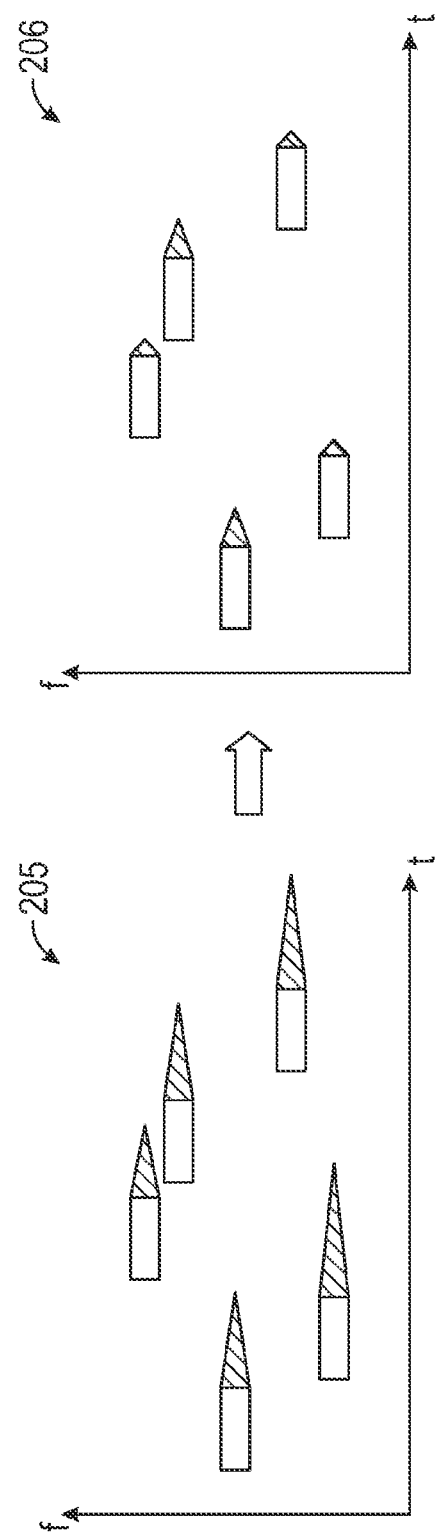
FIG. 2b: shows a diagram illustrating reduction of reverberation of tones using a variable alpha value within a received audio signal in accordance with an embodiment of the invention.

FIG. 2b shows an example where a variable α value across bands compensates for differing RT60 values across the frequency spectrum in converting audio signal 205 to 206.

In embodiments, the value may be passed to one or more of a plurality of decoding engines, or all of a plurality of decoding engines. The decoding engines may be voters as defined in UK Patent Application No. 1617408.8 and a process for decoding the signal may proceed as outlined in that document. For example, each of the voters may be tuned to decode the value in a different way (for example, assuming different acoustic characteristics of the environment) and the decoded value may be decided as that which the most voters agree with.

In one embodiment, as illustrated in FIG. 2c, an impulse response of an acoustic environment may be calculated (in this example, by transmission and capture of a burst of white noise 207 to characterise the frequency response 208 of the space) and the signal may be processed using a transfer function derived from the impulse response. The impulse response may be calculated via measurements of an acoustic space. The input signal prior to performing the FFT is then deconvolved with the impulse response which may remove room artifacts including reverberation, strong reflections, transducer responses and distortions added by the frequency response characteristics of a space. Deconvolution of a reveberant signal with an impulse response reducing the impact of reverberation from an acoustic space is illustrated in FIG. 2d (e.g. the tone is shown at 209 and the reverberation is shown at 210).

In one embodiment, values of α and β can be altered dynamically to increase the system's efficacy during operation or due to changing environmental factors such as different locations or changes to a single space which may affect its reverberation characteristics, such as the materials in it or its layout. Parameters α and β may be changed, for example, by observing the sound energy decay following an encoded tone of known length, or by applying successive values of each and observing and maximising the decoder's tone detection confidence.

Referring to FIG. 3, a method 300 for acoustically transmitting data in accordance with an embodiment of the invention will be described.

In step 301, the data may be encoded into an audio signal using a sequence of tones. The encoding format of the signal may include a header, error correction and a payload. An example of an encoding format is described in relation to FIG. 4. Reed-Solomon may be used as error correction, or other error correction such as Hamming or Turbo Codes. At least one stage of the encoding of the data and/or encoding format of the audio signal may be performed as described in U.S. patent Publication Ser. No. 12/926,470. The audio signal may be human-audible, either fully or at least in part.

The audio signal may be configured to minimise environmental interference. The environmental interference may be that which would be generated by acoustic transmission of signal by the speaker (e.g. 102). The environmental interference may be non-direct acoustic energies caused by this transmission such as reverberation.

The signal may be configured to minimise environmental interference by modifying characteristics of the tones and/or sequence of tones based upon, for example, predicting the environmental interference that would be caused to the audio signal when acoustically received by a receiver (e.g. at a microphone 104). Characteristics of the tones that may be modified may include tone length, tone waveform (e.g. sharp edges to the waveform envelope), tone frequencies (e.g. avoiding resonant frequencies for the environment) or multi-frequency tones. Characteristics of the sequence that may be modified may include lone order (e.g. ordering a high frequency tone before a low frequency tone, and preventing proximity of the same or similar tones in the sequence) and gaps between tones in the sequence.

In embodiments, at least a portion of the audio signal is configured to sequence adjacent tones from high to low to reduce frequency tails from a preceding tone from overlapping with a subsequent tone in a reverberant space. In one example, the initial portion of the audio signal is configured in this way. This initial portion may comprise the header or a portion of the header. This portion may be identical for every signal and constitute the "front-door" sound for the protocol.

Figure 3A:
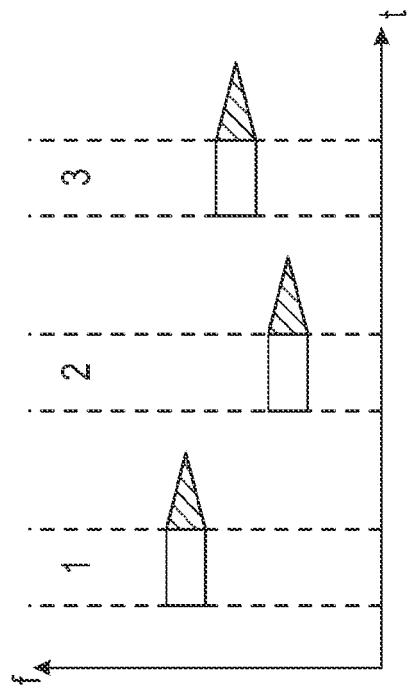
FIG. 3a: shows a diagram illustrating configuring an audio signal to reduce reverberation interference by spacing the tones within the sequence of tones in accordance with an embodiment of the invention.
Figure 3A:
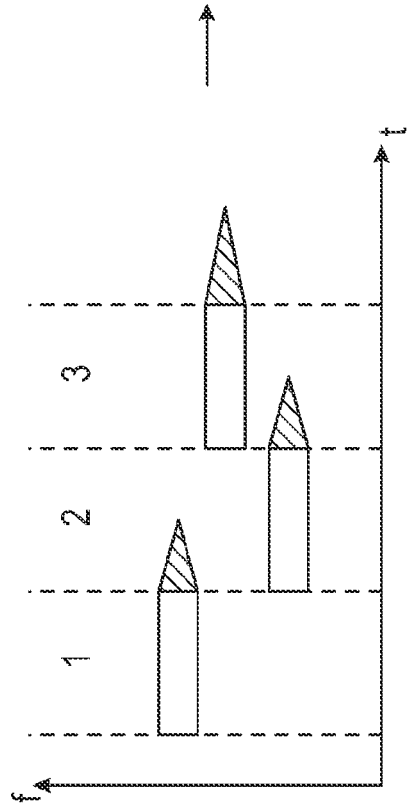

In embodiments as shown in FIG. 3a, at least a portion of the audio signal is configured to insert gaps or time intervals between tones within the sequence of tones to reduce, for example, overlapping frequencies in a reverberant space. This reduces cross-talk between tones.

In embodiments, at least a portion of the audio signal is configured to sharpen the amplitude envelopes of the tone signals within the portion. This may be done by altering the amplitude envelope of each note within the signal, typically by using very short duration attack and decay phases such that the note's total acoustic energy is maximised. Typically also a note will have a short amplitude decay such that the end of the note is clearly defined to have occurred at a specific time.

In embodiments, several steps at the encoding side of the transmission may be made to make the transmission more resilient to reverberation, by altering the signal to avoid temporal effects (acoustic energy remaining after an encoded tone) and spectral effects (specific frequencies being prone to resonance, for example at room modes).

Figure 3B:
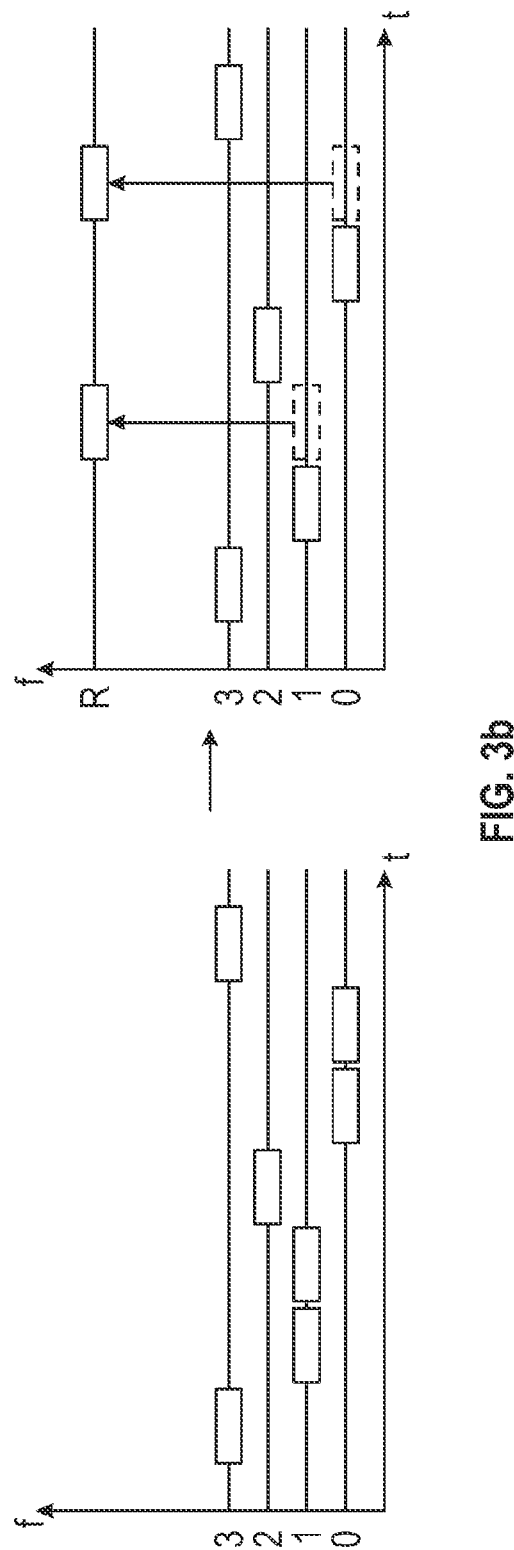
FIG. 3b: shows a diagram illustrating configuring an audio signal to reduce interference by prevented repeated tones within the sequence of tones in accordance with an embodiment of the invention.
Figure 3C:
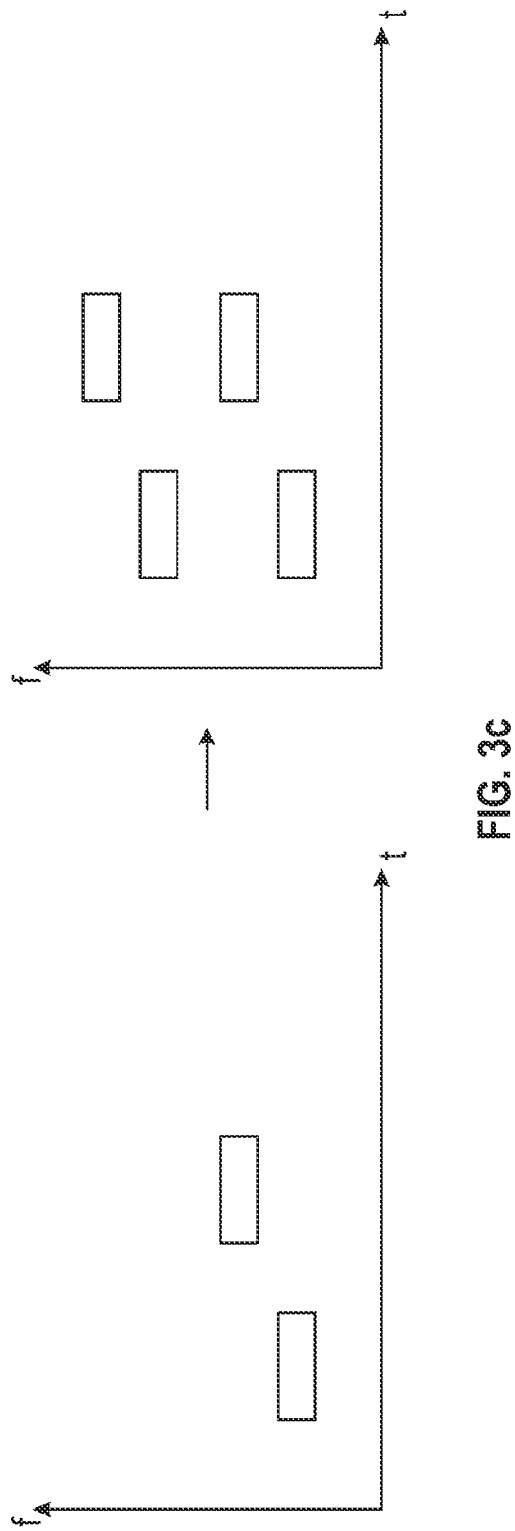
FIG. 3c: shows a diagram illustrating configuring an audio signal to reduce interference by modify tones to include multiple frequencies in accordance with an embodiment of the invention.

1. The 'front door tones' those tones responsible for announcing the commencement of the encoded data are lengthened (providing more energy here for the decoder) and their notes separated by small intervals of silence (allowing reverberant energy to subside in between notes).
2. Reverb is frequency dependent and in most common room acoustics reverberation decay rates are higher (more damped) at higher frequencies. The front-door tones may be thus designed to go high-low such that the first tone is less likely to mask the second when compared to the other way around.
3. Spaces between notes ensure that the acoustic energy in a room is dissipated to a degree between notes— decreasing the likelihood that energy from the previous note(s) will remain at a level at which it could interfere with the peak detection of the current note.
4. The encoder can encode the data in such a way that repeated notes are avoided as shown in FIG. 3b, and subsequent notes are spaced maximally apart with respect to frequency. This again ensures that the energies from neighbouring notes do not interfere with peak detection.
5. Encoding frequencies may be chosen so as to avoid being near resonant frequencies present in the transmission space which may be caused by room modes (resonant frequencies of a room—typically those frequencies with wavelengths at integer multiples of the distance(s) between walls, floor and ceiling). This decreases the likelihood of errors due the effect of longer reverberation energies at particular frequencies.
6. Encoding lone length may be chosen proportional to the reverberation time of the room. This again ensures that the energies from neighbouring notes do not interfere with peak detection.
7. Encoding tones may contain several frequencies as illustrated in FIG. 3c. This again ensures that the energies from neighbouring notes do not interfere with peak detection, and reduces the likelihood that strong resonances or reverberation at lower frequencies affects detection. The frequencies may be independent, similar to having 2 separate channels, or represent in combination a single symbol, similar to the DTMF encoding standard using Dual (or 'n') Tone Multiple Frequency Shift keying which is well known by experts in the field.

Referring to FIG. 3b, Avoiding note repetition is beneficial because the decoder can be configured to avoid classifying the same note twice in sequence, mitigating the effects of reverb. One approach is to replace repeats with an out-of-band "repeat" symbol, indicating that the previous symbol has occurred again. For longer sequences, this can be extended to an arbitrary number of out-of-band repeat symbols.

Referring to FIG. 4, an encoding format will be described. This encoding format comprises a header 400 which includes "front door" start tones. These tones may be the same across all audio signals encoding data within the system and can assist a receiver to determine when an audio signal which encodes data. The encoding format further comprises a payload 401 and forward error correction 402. It can be seen that this encoding format defines the header 400, payload 401 and forward error correction 402 as comprising a sequence of tones across a frequency spectrum. Preferably this frequency spectrum include or comprises the human-audible frequency spectrum. The tones may be monophonic or polyphonic.

Potential advantages of some embodiments of the present invention include:

Improved reliability in environments which create interference in the received signal such as reverberant rooms by making the signal passed to the decoder more closely resemble the output of the encoder;

The processing of the signal is both performant and efficient (both in memory and time) and requires no prior training or knowledge of the expected signal; and No direct measurement of the acoustic space either before transmission or during is necessary, though the option to do so is still available in order to further minimise environmental interference.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method for encoding data for acoustic transmission, including:
   encoding the data into an audio signal comprising a sequence of tones, wherein tone lengths of the sequence of tones are proportional to a reverberation time of a room where the audio signal is to be transmitted to minimize environmental interference.

2. The method as claimed in claim 1, wherein the sequence of tones includes a plurality of tones corresponding to front-door tones for announcing commencement of tones encoding the data and a plurality of tones corresponding to the data.

3. The method as claimed in claim 1, wherein the sequence of tones includes a plurality of tones corresponding to forward error correction tones.

4. The method as claimed in claim 1, wherein the data comprises a header, an error correction and a payload and each tone of the sequence of tones corresponds to the header, the error correction or the payload, and the header includes a plurality of polyphonic tones which are the same across multiple acoustically transmitted signals.

5. The method as claimed in claim 1, wherein a tone waveform of at least some tones of the sequence of tones are modified to minimize the environmental interference.

6. The method as claimed in claim 1, wherein a tone frequency of at least some tones of the sequence of tones are modified to minimize the environmental interference.

7. The method as claimed in claim 1, wherein characteristics of at least some tones of the sequence of tones are modified to minimize the environmental interference based upon predictions of interference caused to the sequence of tones when received by a receiver.

8. The method as claimed in claim 1, wherein the environmental interference includes non-direct acoustic energy caused by transmission of the audio signal.

9. The method as claimed in claim 1, wherein the audio signal is configured by configuring the sequence of tones such that frequencies of at least some tones of the sequence of tones are arranged from high to low.

10. The method as claimed in claim 1, further comprising acoustically transmitting the encoded audio signal for receipt by a microphone.

11. The method as claimed in claim 1, wherein the audio signal is configured to minimize environmental interference by configuring the sequence of tones to avoid repeating frequency tones in adjacent tones of the sequence of tones by replacing a repeating frequency tone with a predetermined frequency tone, wherein the same predetermined frequency tone is used to indicate a repetition of tones regardless of which frequency tone is being repeated.

12. The method as claimed in claim 11, wherein the predetermined frequency tone is out-of-band of other frequencies of the sequence of tones.

13. The method as claimed in claim 1, wherein the sequence of tones includes tones corresponding to front-door tones for announcing commencement of the encoded data, the front-door tones include a plurality of polyphonic tones which are the same across multiple acoustically transmitted signals.

14. An apparatus for encoding data for acoustic transmission, the apparatus comprising one or more processors configured to control the apparatus to:
encode the data into an audio signal comprising a sequence of tones, wherein tone lengths of the sequence of tones are proportional to a reverberation time of a room where the audio signal is to be transmitted to minimize environmental interference.

15. The apparatus of claim 14, wherein the sequence of tones includes a plurality of tones corresponding to front-door tones for announcing commencement of tones encoding the data and a plurality of tones corresponding to the data.

16. The apparatus of claim 14, wherein the sequence of tones includes a plurality of tones corresponding to forward error correction tones.

17. The apparatus of claim 14, wherein the data comprises a header, an error correction and a payload and each tone of the sequence of tones corresponds to the header, the error correction or the payload, and the header includes a plurality of polyphonic tones which are the same across multiple acoustically transmitted signals.

18. The apparatus of claim 14, wherein the one or more processors are further configured to control the apparatus to: modify a tone waveform of at least some tones of the sequence of tones to minimize the environmental interference.

19. The apparatus of claim 14, wherein the one or more processors are further configured to control the apparatus to: modify a tone frequency of at least some tones of the sequence of tones to minimize the environmental interference.

20. The apparatus of claim 14, wherein the one or more processors are further configured to control the apparatus to: modify characteristics of at least some tones of the sequence of tones to minimize the environmental interference based upon predictions of interference caused to the sequence of tones when received by a receiver.

21. The apparatus of claim 14, further comprising a speaker, and wherein the one or more processors are further configured to control the apparatus to: acoustically transmit, using the speaker, the encoded audio signal for receipt by a microphone.

22. The apparatus of claim 14, wherein the audio signal is configured to minimize environmental interference by configuring the sequence of tones to avoid repeating frequency tones in adjacent tones of the sequence of tones by replacing a repeating frequency tone with a predetermined frequency tone, wherein the same predetermined frequency tone is used to indicate a repetition of tones regardless of which frequency tone is being repeated.

23. The apparatus of claim 14, wherein the sequence of tones includes tones corresponding to front-door tones for announcing commencement of the encoded data, the front-door tones include a plurality of polyphonic tones which are the same across multiple acoustically transmitted signals.

24. A non-transitory computer readable medium having stored therein computer-readable instructions that, when executed by one or more processors, cause the one or more processors to:
encode data into an audio signal comprising a sequence of tones, wherein tone lengths of the sequence of tones are proportional to a reverberation time of a room where the audio signal is to be transmitted to minimize environmental interference.

25. A method for encoding data for acoustic transmission, including:
encoding the data into an audio signal comprising a sequence of tones, wherein the sequence of tones includes a plurality of tones corresponding to front-door tones for announcing commencement of tones encoding the data, a plurality of tones corresponding to the data, and a plurality of tones corresponding to forward error correction tones,
wherein tone lengths of the sequence of tones are proportional to a reverberation time of a room where the audio signal is to be transmitted to minimize environmental interference.

26. The method as claimed in claim 25, further comprising interleaving the plurality of tones corresponding to the data with the plurality of tones corresponding to forward error correction tones.

27. The method as claimed in claim 25, wherein a tone waveform or a tone frequency of at least of at least some tones of the sequence of tones are modified to minimize environmental interference.

28. The method as claimed in claim 25, wherein the front-door tones include a plurality of polyphonic tones which are the same across multiple acoustically transmitted signals.

29. A method for encoding data for acoustic transmission, including:
encoding the data into an audio signal comprising a sequence of tones,
wherein the audio signal is configured to minimize environmental interference by configuring the sequence of tones to avoid repeating frequency tones in adjacent tones of the sequence of tones by replacing a repeating frequency tone with a predetermined frequency tone, wherein the same predetermined frequency tone is used to indicate a repetition of tones regardless of which frequency tone is being repeated.

30. A method for encoding data for acoustic transmission, including:

encoding the data into an audio signal comprising a sequence of tones, wherein the sequence of tones includes a plurality of tones corresponding to front-door tones for announcing commencement of tones encoding the data, a plurality of tones corresponding to the data, and a plurality of tones corresponding to forward error correction tones; and interleaving the plurality of tones corresponding to the data with the plurality of tones corresponding to forward error correction tones.

* * * * *